UNITED STATES PATENT OFFICE.

EDWARD GOODRICH ACHESON, OF STAMFORD TOWNSHIP, ONTARIO, CANADA.

METHOD OF PREPARING DEHYDRATED MIXTURES.

1,030,372.  Specification of Letters Patent.  Patented June 25, 1912.

No Drawing.  Application filed August 25, 1909. Serial No. 514,553.

*To all whom it may concern:*

Be it known that I, EDWARD GOODRICH ACHESON, a citizen of the United States, residing at Stamford township, Ontario, Canada, have invented certain new and useful Improvements in Methods of Preparing Dehydrated Mixtures, of which the following is a specification.

The object of this invention is the provision of a method of transferring deflocculated bodies, precipitates, or bodies in a state of extremely fine subdivision, from an aqueous to a non-aqueous medium, the method being specifically applicable to the transference of deflocculated graphite from an aqueous paste or mixture to oil, in such manner as to produce therefrom an oil paste, free or substantially free from water, and freely miscible with and capable of suspension in oil.

In my prior Patent No. 911,358, granted February 2, 1909, I have claimed the method of preparing non-aqueous mixtures, which consists in deflocculating an amorphous body in presence of water, and then replacing the water by a non-aqueous medium: in said patent I have also claimed the product thereby prepared. One specific method of operation described in the aforesaid patent consists in deflocculating graphite or other amorphous body in presence of an aqueous solution or infusion of tannin or equivalent deflocculating agent, preparing a paste containing the deflocculated body and water, and then working, macerating or grinding this paste with oil until the water is displaced. The product produced by this method is freely miscible with oil and capable of suspension therein.

The present invention relates to a specific method of effecting the above transference, without the necessity of grinding the water-paste containing the deflocculated material during the step of transferring the deflocculated body into oil or other non-aqueous medium. This method involves as its essential features the introduction of the water-paste or mixture containing the deflocculated body into a body of the medium, as oil, with which it is desired to replace the water, and its agitation therein under such temperature conditions as to effect a gradual and substantially complete expulsion of the water from the oil by evaporation.

I have found that it is practicable to expel the water from a paste containing deflocculated graphite and water, by stirring the paste into a bath of oil or other non-aqueous medium having a relatively low vapor tension, and while distributing and suspending the graphite in the oil by suitably agitating the mixture, maintaining such temperature conditions that the water will escape as vapor from the exposed surface of the oil. This temperature need not exceed the boiling point of water and may be much below this point. It is found in practice that graphite which has been deflocculated with tannic acid will again flocculate if the aqueous paste be too strongly heated in the oil, more particularly during the earlier stages of the operation while considerable proportions of water are yet present. It is regarded as preferable therefore, under these or similar circumstances, to maintain the temperature at a comparatively low point, as 60°–85° C., until most of the water has been expelled or evaporated, after which the temperature may be raised somewhat to complete the dehydration of the mass. It will be understood that the elimination of the water may be hastened by the provision of means for extending the surface from which the evaporation takes place, by reducing the pressure upon the surface, or otherwise, as will be understood by those skilled in the art.

In case the deflocculated graphite is to be transferred to a mineral oil for use as a lubricant, the water-paste may be treated at once with a proper quantity of such oil, the proportion of oil being sufficient to form a mobile mixture or cream as distinguished from a paste: from 5 to 10% of graphite in the oil will yield a mixture or suspension of suitable consistence. The oil should be substantially neutral, as acid oils tend to flocculate the graphite if added to the water-paste. Or the water of the paste may be displaced by vegetable oils or other media which are miscible with or soluble in the mineral oil which is to form the ultimate medium for the graphite, the water-free mixture prepared from the water-paste being readily stirred into the mineral oil and the graphite becoming suspended therein. The proportion of graphite required to increase the effectiveness of a lubricating oil, whether the original oil be of a lubricating or non-lubricating grade, is very small, 0.35% of the weight of the oil being quite sufficient for most purposes. For the preparation of the lubricant it is merely necessary therefore to properly dilute, with a suitable oil, the dehydrated mass obtained as above described.

Any suitable apparatus may be employed in the practice of the method, it being essential merely that the mixture should be effectively stirred while presenting free surfaces for the evaporation of water, and that means should be provided for controlling the temperature conditions. In practice I have placed the mixture of moist deflocculated graphite with oil in an open metallic vessel provided with an agitator adapted to stir the contents thoroughly and to maintain the solid material in suspension: this vessel is immersed in a bath of oil or other liquid the temperature of which can be accurately regulated, as by the provision in the oil bath of an electrical resistor in circuit with a suitable rheostat. The duration of the operation will vary in accordance with the quantity of water to be evaporated and the temperature, several days being required at times when the conditions necessitate the use of temperatures considerably below the boiling point of water.

I claim:

1. The method of preparing dehydrated mixtures containing deflocculated graphite and oil, which consists in mixing the moist deflocculated graphite with oil, agitating the mixture, and evaporating the water therefrom.

2. The method of preparing dehydrated mixtures containing deflocculated graphite and oil, which consists in suspending moist deflocculated graphite in oil, agitating the mixture, and evaporating the water therefrom.

In testimony whereof, I affix my signature in presence of two witnesses.

EDWARD GOODRICH ACHESON.

Witnesses:
   WM. ACHESON SMITH,
   EBEN C. SPEIDEN.